Patented Oct. 1, 1935

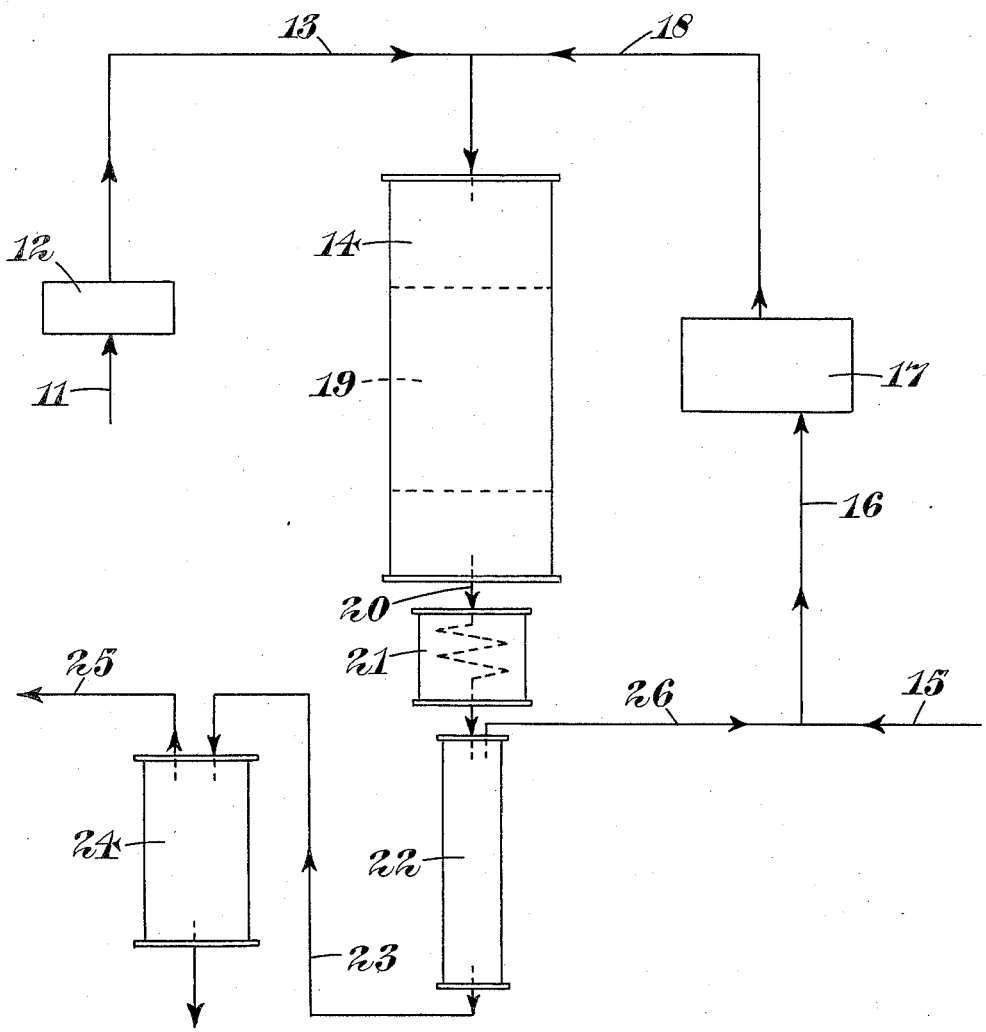

2,016,169

UNITED STATES PATENT OFFICE 2,016,169

HYDROGENATION OF CARBONACEOUS MATERIALS

Roland Hall Griffith, Robert Nigel Beresford Dalrymple Bruce, and Samuel Gerald Hill, London, England, assignors to The Gas Light & Coke Company, Westminster, England, a British company Application April 17, 1933, Serial No. 666,626
In Great Britain April 27, 1932

6 Claims. (Cl. 196—53)

This invention consists in improvements in or relating to the hydrogenation of carbonaceous materials and has particular reference to processes for the hydrogenation of high boiling-point hydrocarbons and derivatives thereof by treatment with hydrogen or hydrogen-containing gases such as water gas, at an elevated temperature and pressure with the formation of hydrocarbons having a lower boiling point than the boiling point of the hydrocarbon or derivative treated. The carbonaceous materials that may be treated include coal tar, natural petroleum, asphalt, bitumen, heavy oils and oil fractions produced from these substances. The hydrocarbon derivative may be a phenolic body.

It is characteristic of the present invention that the hydrogenation process is carried out in a continuous manner by feeding the high boiling-point hydrocarbon and the hydrogenating gas continuously to the reaction zone and withdrawing the products continuously and the expression "continuous process" is hereinafter used to denote such a process.

Various proposals have been made for promoting the hydrogenation of carbonaceous materials by means of catalysts and it has now been found that greatly improved results are obtained by employing as a catalyst basic oxygenated salts of titanium. These catalysts possess the great advantage that their activity is not greatly diminished by use.

The present invention accordingly comprises a continuous process for the hydrogenation of high boiling-point hydrocarbons or derivatives thereof wherein the carbonaceous materials are subjected to the action of hydrogen or hydrogen-containing gas at an elevated temperature and pressure in the presence of a catalyst comprising a basic oxygenated salt of titanium or a reduction or conversion product thereof. The term "basic oxygenated salt of titanium" as hereinafter used is intended to include not only the basic oxygenated salt of titanium itself but also the reduction or conversion products thereof. The catalyst may conveniently comprise the basic titanium salts of acids corresponding to certain elements of the fifth and sixth groups of the periodic classification, for example the basic phosphate, vanadate, chromate, molybdate or tungstate of titanium.

The catalyst is preferably employed in the form of granules or pellets prepared by extruding the moist basic salt and thereafter drying. Alternatively, the granules or pellets may be prepared by mixing with the basic titanium salt an inert binding agent such as clay and extruding the moist mixture.

The continuous hydrogenation process in which the basic titanium catalyst is used may be carried out in any convenient form of apparatus; thus the mixture of hydrogen or hydrogen-containing gas together with a carbonaceous material to be treated may be circulated under pressure through a heated chamber containing the solid catalyst. The reaction may be preferably carried out at a pressure exceeding 50 atmospheres and at a temperature between 350° and 550° C. Titanium catalysts (unlike some of the other catalysts which have been proposed for the hydrogenation of carbonaceous materials) are not poisoned by sulphur and it is thus possible and is indeed in some cases advantageous to employ gases containing hydrogen sulphide as the hydrogenating gas. There are some indications that chlorides decrease the activity of basic titanium catalysts and it is therefore desirable to remove chlorides from the catalyst when these substances have been used in the preparation of the basic salt.

The basic titanium catalysts may be obtained for example by treating solutions of titanium chloride with solutions of the sodium salts of the corresponding acids; thus when the basic titanium salt of tungstic acid is required a solution of titanium chloride may be treated with a solution of sodium tungstate. Alternatively titanium hydroxide may be digested with a solution of the corresponding acid; thus titanium hydroxide may be digested with chromic acid in the preparation of the basic titanium chromate.

The basic titanium catalysts herein described are particularly advantageous for the treatment of those raw materials which are liquid at ordinary temperatures or which are readily fusible solids.

Following are descriptions by way of example and with reference to the accompanying diagrammatic drawing of methods of employing the present invention in the production from high boiling hydrocarbons of hydrocarbons of lower boiling point.

In the drawing 11 is a pipe line for leading high boiling point oil to a pump 12 from which it passes through a pipe line 13 to a preheater 14. Hydrogen is passed via pipe-lines 15 and 16 to a gas-compressor 17 and thence through pipe-line 18 into the pre-heater 14 together with the oil. In the pre-heater the oil is vaporized and the oil vapor and hydrogen is then passed through the catalyst supported in the space 19. The product leaves the reaction chamber by way of pipe 20 and passes through a condenser 21 in which the liquid products are condensed. The condensed liquid and any excess of gas pass into the separator 22 in which the excess of hydrogenating gas is separated from the condensed liquid and is returned from the separator 22 through the pipe-line 26 and is mixed with further hydrogen entering the circuit through the pipe 15. The condensed liquid passes through pipe-line 23 to a further separator 24 where the pressure is reduced to atmospheric and separation of the liquid products from any dissolved or admixed gas takes place. This gas leaves the separator through the pipe-line 25.

*Example I*

A solution of titanic chloride is treated with sodium vanadate solution. The yellow precipitate consisting of the hydrated basic vanadate of titanium, $2TiO_2.V_2O_5.nH_2O$ is washed until free from chloride and powdered, made into pellets with clay, and used in a high-pressure reaction vessel in apparatus of the type shown in the accompanying diagrammatic drawing for treating a creosote fraction from coal tar. With a throughput of 500 c. c. of raw material per litre of catalyst per hour, at 475° C., a product is obtained in which 35% boils below 180°.

*Example II*

This example illustrates the preparation of the basic titanium salt of chromic acid without the necessity for using titanium chloride. 3.5 parts of titanium hydroxide are digested with a solution containing one part of chromic acid. The mixture is evaporated to a paste, the paste is formed into pellets by extrusion and the pellets dried.

In one example of the use of this catalyst a creosote oil from high temperature tar is treated at a pressure of 200 atmospheres and at a temperature of between 460° C. and 475° C. with hydrogen in the presence of granules of basic titanium chromate. With a throughput of 500 c. c. per hour per litre of catalyst space, a product containing about 35 to 40% of light spirit (boiling below 180° C.) is obtained.

*Example III*

A basic titanium chromate catalyst prepared as described in Example II, when used for the treatment of a low-temperature tar oil at 460° C. and 200 atmospheres, with a throughput of 500 c. c. per hour per litre of catalyst space, gave a product 45% of which boiled below 180° C.

*Example IV*

A basic titanium molybdate catalyst is prepared by dissolving 15 grams of titanic chloride in 500 c. c. of water at 60° C. treating the sodium with aqueous ammonia until precipitation just begins to take place, and then treating with a solution of 4 to 5 grams of sodium molybdate in 100 c. c of water. The white precipitate of basic titanium molybdate is washed and powdered and made into pellets either alone, or mixed with clay or other binding agent. These pellets are packed in the reaction vessel. Working at 460° C. and at 200 atmospheres pressure with a low-temperature tar oil and with a throughput of 500 c. c. per hour per litre of catalyst, 60% of the product had a boiling-point below 180° C.; at double the above throughput the spirit content was 45%.

*Example V*

With basic titanium molybdate as prepared in Example IV, a creosote fraction from high-temperature tar, treated at 460° C. and 200 atmospheres pressure with a throughput of 500 c. c. per hour per litre of catalyst, gave a 48% conversion to spirit boiling below 180° C.

*Example VI*

With the titanium molybdate catalyst prepared as described in Example IV, a gas oil at a throughput of 1 litre per hour per litre of catalyst gave a product, at 480° C., containing 55–60% spirit boiling below 180° C.

*Example VII*

Basic titanium tungstate, obtained from titanic chloride and sodium tungstate by a process similar to that described in Example IV, was used to treat a creosote (as described in Example V) at 460° C. With a throughput of 500 c. c. per hour per litre of catalyst the conversion to spirit boiling below 180° C. was 35–40%.

When in the above examples there is substituted for basic titanium salts a mixture of titanium oxide with the oxides of the other elements mentioned the percentage conversion of high boiling hydrocarbon to lower boiling liquids is of an altogether lower order.

It is within the scope of this invention to employ basic titanium salts mixed with or deposited on inert material and to use mixtures of basic titanium salts with one another, with other catalysts or with promoters.

We claim:—

1. A continuous process for the hydrogenation of high boiling hydrocarbons or their derivatives for the production of lower boiling hydrocarbons wherein the said carbonaceous materials are subjected to the action of a hydrogenating gas at a temperature between 340° C. and 550° C. and a pressure above 50 atmospheres in the presence of a catalyst comprising a basic oxygenated titanium salt of an acidic oxide chosen from the group vanadium, molybdenum, or tungsten.

2. A continuous process for the hydrogenation of high boiling hydrocarbons or their derivatives for the production of lower boiling hydrocarbons which consists in passing the said carbonaceous materials together with a hydrogenating gas maintained at a pressure above 50 atmospheres over a catalyst comprising a basic oxygenated titanium salt of an acidic oxide of molybdenum maintained at a temperature between 350° and 550° C.

3. A continuous process for the hydrogenation of high boiling hydrocarbons or their derivatives for the production of lower boiling hydrocarbons which consists in passing the said carbonaceous materials together with a hydrogenating gas maintained at a pressure above 50 atmospheres over a catalyst comprising a basic oxygenated titanium salt of an acidic oxide of vanadium maintained at a temperature between 350° and 550° C.

4. A continuous process for the hydrogenation of high boiling hydrocarbons or their derivatives for the production of lower boiling hydrocarbons which consists in passing the said carbonaceous materials together with a hydrogenating gas maintained at a pressure above 50 atmospheres over a catalyst comprising a basic oxygenated titanium salt of an acidic oxide of tungsten maintained at a temperature between 350° and 550° C.

5. A continuous process for the destructive hydrogenation of high boiling point hydrocarbons and derivatives thereof for the production of lower boiling hydrocarbons which comprises vaporizing the said high boiling point hydrocarbon or derivative thereof, mixing the vaporized carbonaceous material with a hydrogenating gas, maintaining the pressure of the gaseous mixture above 50 atmospheres and passing it in contact with a catalyst comprising a basic oxygenated titanium salt of an acidic oxide chosen from the group vanadium, molybdenum, or tungsten maintained at a temperature between 340° and 550°.

6. A continuous process for the hydrogenation of high boiling hydrocarbons or their derivatives for the production of low boiling hydrocarbons which consists in passing the said carbonaceous materials together with a hydrogenating gas at a temperature between 340° C. and 550° C. and at a pressure above 50 atmospheres over a catalyst comprising a basic oxygenated titanium salt of an acidic oxide chosen from the group vanadium, molybdenum, or tungsten.

ROLAND HALL GRIFFITH.
ROBERT NIGEL BERESFORD
          DALRYMPLE BRUCE.
SAMUEL GERALD HILL.